Patented Jan. 4, 1938

2,104,286

UNITED STATES PATENT OFFICE 2,104,286

PHOSPHOROUS ACID ESTERS OF HYDROXY-ALKYLAMINO ANTHRAQUINONES

Fritz Baumann, Leverkusen-I. G. Werk, Germany, assignor to General Aniline Works, Inc., New York, N. Y., a corporation of Delaware No Drawing. Application February 26, 1936, Serial No. 65,921. In Germany March 4, 1935

6 Claims. (Cl. 260—60)

The present invention relates to new acid wool dyestuffs of the anthraquinone series and to the process of preparing the same.

The new dyestuffs which are obtainable in accordance with this invention may be defined as phosphorous or phosphoric acids, which are partly esterified with amino anthraquinones containing attached to the nitrogen of the amino group hydroxyl groups bearing substituents. Particular claim is laid upon phosphorous acid esters and among those upon the 1,4-di(hydroxy-ethylamino)-anthraquinone derivatives and the 1-hydroxy-ethylamino - 4 - arylamino-anthraquinone derivatives. Generally, phosphorous acid esters of hydroxyalkylaminoanthraquinones are preferred. All these compounds are soluble in water either per se or in form of their alkali metal salts with a red, violet, blue or green coloration, and dye animal fibers from an acid bath the same shades. My new dyestuffs show good equalizing properties, the dyeings obtained therefrom being distinguished by their good fastness to light. Examples for aminoanthraquinones with hydroxy groups bearing substituents are such alpha- or beta-aminoanthraquinones as contain attached to the nitrogen of the amino group at least hydroxyalkyl, hydroxyaralkyl, hydroxyaryl or hydroxyhydroaryl residue. The following specific aminoanthraquinone derivatives have proved to be suitable for the purpose in question:

1-hydroxyethylamino-anthraquinone,
1-hydroxyethylamino-4-bromo-anthraquinone,
1-hydroxyethylamino - 4 - arylamino - anthraquinone,
1,4 - di(hydroxyethylamino) -5,8- dihydroxy - anthraquinone,
1,4-di(para-hydroxyanilido) anthraquinone,
1-hydroxy-butylamino-anthraquinone,
1 - beta -hydroxy-gamma-chloropropylamino-anthraquinone,
1 -(beta - gamma - dihydroxy)- propylamino-anthraquinone,
1-(para-hydroxyethyl)-anilido-anthraquinone.

Anthraquinone derivatives, such as anthrapyridones or anthrapyrimidines are intended to fall within the class of compounds called for by the appended claims.

Another object of my invention is the preparation of the above defined new acid wool dyestuffs of the anthraquinone series. The process of manufacture of these compounds is by causing halogenides of acids of phosphorus, such as phosphorus trichloride, phosphorus oxychloride or phosphorus pentachloride or the corresponding bromides to react upon such aminoanthraquinones as contain attached to the nitrogen of the amino group hydroxyl groups bearing substituents. The starting materials are reacted upon each other either in the presence or in the absence of indifferent diluents, such as chlorobenzene, chlorotoluene or nitrobenzene, until the reaction product has become water soluble either per se or in form of its alkali metal salt. The addition of acid binding agents, such as pyridine, may be of advantage in most cases. The reaction proceeds at room temperature or at slightly elevated temperature. When working in the presence of indifferent diluents, the reaction product precipitates in most cases, otherwise it can be isolated by adding the cake or the solution to a soda solution, removing the solvents which may be present by steam distillation and precipitating the reaction product by acidifying or salting out.

It is a preferred form of my process to start from such aminoanthraquinone derivatives of the character described as contain, furthermore, easily exchangeable substituents, such as halogen or nitro groups. The reaction products obtainable therefrom can be employed as intermediates for the preparation of further modified anthraquinone derivatives.

The following examples illustrate the invention, without, however, restricting it thereto, the parts being by weight:—

Example 1

10 parts of 1-hydroxyethylamino-anthraquinone are heated while stirring to 60–65° C. with 50 parts of phosphorus trichloride. The starting material is quickly dissolved and the reaction is interrupted as soon as the evolution of hydrochloric acid has ceased. After cooling, the solution is poured into ice water from which after decomposition of the excess of phosphorus trichloride the phosphorous acid ester of the 1-hydroxyethylaminoanthraquinone is precipitated. The red ester is filtered off and washed several times with water, thereupon it is redissolved as sodium salt. If the red solution is salted out by common salt, the ester salt is obtained, which crystallizes in red needles; it is filtered with suction and dried. The sodium salt is easily soluble in water with a red coloration; by the addition of an acid the free ester is precipitated. Wool is dyed even red shades.

*Example 2*

Into 35 parts of chlorobenzene 5 parts of 1.4-dihydroxyethylaminoanthraquinone are introduced with the addition of 12 parts of phosphorus trichloride; the mixture is heated to 65–70° C. until a test portion taken has become water soluble. Upon cooling the halogen-containing phosphorous acid ester crystallizes out and can be filtered with suction. The compound may be used either directly or after transformation into the sodium salt. The dyestuff dyes wool very clear blue shades.

*Example 3*

1 - hydroxyethylamino-4-bromoanthraquinone is heated for a short time in 5 times its quantity of phosphorus trichloride to 70° C.; the reaction product, which crystallizes in red needles on cooling, is filtered with suction. To the cake thus obtained, which is suspended in cold water, sodium carbonate is added, whereupon any water insoluble residue, which may remain, is filtered off. The isolation of the compound is best effected by acidifying with hydrochloric acid. The substance crystallizes in fine red needles, is soluble in water with a bluish-red coloration and dyes wool similar shades.

In the above described compound the bromine atom can be replaced by amines according to usual methods, if desired without previous isolation of the product. Violet to greenish-blue dyestuffs are thus obtained.

*Example 4*

The phosphorous acid ester obtained according to Example 3 from 8 parts 1-hydroxyethylaminoanthraquinone is dissolved in the form of its sodium salt in 100 parts of water; 8 parts of sodium carbonate, 12 parts of aniline and 0.2 part of cuprous chloride are added thereto; the whole is heated for about 1 hour under reflux until the blue color changes no longer. The finished melt is diluted with methyl alcohol and the blue dyestuff is filtered with suction. The compound which is difficultly soluble in water is redissolved in pyridine water and precipitated from the filtrate by a common salt solution. The substance dyes wool blue shades.

Various aliphatic, aromatic or hydroaromatic amines, partly hydrogenated naphthylamines and the like may be used for the reaction instead of aniline. The para-toluidine and anisidine yield more greenish blues, para-aminoacetoanilide yields a greenish blue, hexahydroaniline an extremely clear red-blue.

*Example 5*

5 parts of 1-hydroxyethylaminoanthraquinone are heated in 25 parts of phosphorus oxychloride to about 80° C. As soon as the violent evolution of hydrochloric acid has ceased, a test portion taken from the melt is soluble in dilute soda solution with a red coloration. The solution is introduced into ice water and the precipitate filtered with suction and dissolved in a sodium carbonate solution. After acidification the filtered solution is salted out with acetic acid and common salt.

The phosphoric acid ester thus obtained yields dyeings, such as are obtainable from the compound described in Example 1.

The 1-hydroxyethylamino-4-bromoanthraquinone can be transformed in the same manner into the phosphoric ester, in which the bromine atom can likewise be replaced by amino groups.

If 2 mols of phosphorus pentachloride are caused to react upon 1.4-dihydroxyethylamino-5.8-dihydroxyanthraquinone in nitrobenzene at a temperature of about 50° C., a product is obtained which is soluble in water with a bluish-green coloration and which dyes wool even blue shades.

*Example 6*

The green anthraquinone derivative of the following formula:—

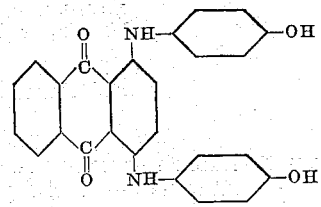

is mixed with 15 times the quantity of anhydrous pyridine with the addition of 1.2 times the quantity of phosphorus oxychloride at a temperature of 40–50° C. The green melt thus obtained is poured into a dilute solution of sodium carbonate from which the pyridine is removed by steam. The dyestuff is salted out with potassium chloride at room temperature. The dyestuff is difficultly soluble in dilute mineral acids and dyes wool green shades from an acid bath.

I claim:—

1. Acid wool dyestuffs of the anthraquinone series having the probable constitution of phosphorous acids and phosphoric acids which are partly esterified with amino-anthraquinones containing attached to the amino group a substituent selected from the group consisting of a hydroxyalkyl, hydroxyaralkyl, hydroxyaryl and a hydroxyhydroaryl residue, these dyestuffs being obtainable by causing halogenides of acids of phosphorus selected from the group consisting of phosphorus trihalogenides, phosphorous oxyhalogenides and phosphorus pentahalogenides to react upon amino-anthraquinones of the character described until the reaction product has become soluble in water either per se or in form of its alkali metal salt.

2. Acid wool dyestuffs of the anthraquinone series having the probable constitution of phosphorus acids which are partly esterified with hydroxyethylamino-anthraquinones, these dyestuffs being obtainable by causing phosphorus trihalogenides to react upon hydroxyethylamino-anthraquinones until the reaction product has become soluble in water either per se or in form of its alkali metal salt.

3. Acid wool dyestuffs of the anthraquinone series having the probable constitution of phosphorus acids which are partly esterified with di-(hydroxyethylamino)-anthraquinones, these dyestuffs being obtainable by causing phosphorus trihalogenides to react upon di-(hydroxyethylamino) anthraquinones until the reaction product has become soluble in water either per se or in form of its alkali metal salt.

4. Acid wool dyestuffs of the anthraquinone series having the probable constitution of phosphorus acids which are partly esterified with 1-hydroxyethylamino-4-arylaminoanthraquinones, these dyestuffs being obtainable by causing phosphorus trihalogenides to react upon 1-hydroxyethylamino-4-arylaminoanthraquinones until the reaction product has become soluble in water either per se or in form of its alkali metal salt.

5. The process which comprises causing halogenides of acids of phosphorus selected from the group consisting of phosphorus trihalogenides, phosphorus oxyhalogenides and phosphorus pentahalogenides to react upon aminoanthraquinones containing attached to the nitrogen of the amino groups a substituent selected from the group consisting of a hydroxyalkyl, hydroxyaralkyl, hydroxyaryl and a hydroxyhydroaryl residue, the reaction being performed until the reaction product has become soluble in water either per se or in form of its alkali metal salt.

6. The process as claimed in claim 5, wherein the reaction is performed in the presence of indifferent solvents.

FRITZ BAUMANN.